(12) United States Patent
Huebner et al.

(10) Patent No.: US 11,220,347 B2
(45) Date of Patent: Jan. 11, 2022

(54) MODULAR SUBFLOOR ARRANGEMENT FOR AN AIRCRAFT

(71) Applicant: AIRBUS HELICOPTERS DEUTSCHLAND GMBH, Donauworth (DE)

(72) Inventors: Gottfried Huebner, Fuenfstetten (DE); Stefan Probst, Schoenau (DE); Frank Loeser, Kaisheim (DE); Robert Seiler, Moenchsdeggingnen (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 272 days.

(21) Appl. No.: 16/443,960

(22) Filed: Jun. 18, 2019

(65) Prior Publication Data
US 2019/0389592 A1    Dec. 26, 2019

(30) Foreign Application Priority Data

Jun. 20, 2018  (EP) .................................... 18400017

(51) Int. Cl.
*B64D 37/04* (2006.01)
*B64C 1/06* (2006.01)
(Continued)

(52) U.S. Cl.
CPC .............. *B64D 37/04* (2013.01); *B64C 1/061* (2013.01); *B64C 1/18* (2013.01); *B64D 37/06* (2013.01); *B64D 37/16* (2013.01); *B64C 27/04* (2013.01)

(58) Field of Classification Search
CPC ........... B64C 1/18; B64C 1/061; B64C 1/068; B64C 1/069; B64C 27/04; B64D 37/04; B64D 37/0406
See application file for complete search history.

(56) References Cited

U.S. PATENT DOCUMENTS 3,966,147 A    6/1976  Wittko et al.
9,517,831 B2  12/2016  Fink et al.
(Continued)

FOREIGN PATENT DOCUMENTS

WO    2005012085 A1   2/2005
WO    2015048695 A1   4/2015

OTHER PUBLICATIONS

European Search Report for European Application No. EP 18400017.2, Completed by the European Patent Office, dated Nov. 23, 2018, 8 pages.

*Primary Examiner* — Joshua J Michener
*Assistant Examiner* — Cindi M Curry
(74) *Attorney, Agent, or Firm* — Brooks Kushman P.C.

(57) ABSTRACT

A modular subfloor system comprises first longitudinal structural frames, lateral regions, and a modular tank system that is connected to the first longitudinal structural frames. The modular tank system comprises a bottom shell, an upper panel, second longitudinal structural frames arranged between the bottom shell and the upper panel and transversal structural frames that are arranged between the bottom shell and the upper panel. The transversal structural frames and the second longitudinal structural frames form compartments. The modular tank system further comprises tank bladders arranged in at least some of the compartments and sealing elements that seal the upper panel, the bottom shell, and the at least some of the compartments of the modular tank system.

20 Claims, 5 Drawing Sheets

(51) Int. Cl.
  *B64C 1/18* (2006.01)
  *B64D 37/06* (2006.01)
  *B64D 37/16* (2006.01)
  *B64C 27/04* (2006.01)

(56) References Cited

U.S. PATENT DOCUMENTS

| | | |
|---|---|---|
| 9,623,950 B2 | 4/2017 | Fink et al. |
| 9,688,381 B2 * | 6/2017 | Fink .................... B64C 1/062 |
| 9,868,544 B2 | 1/2018 | Bistuer et al. |
| 2005/0178916 A1 * | 8/2005 | Howe ................... B64D 37/04 |
| | | 244/135 R |
| 2006/0231681 A1 * | 10/2006 | Huber .................... B64C 1/064 |
| | | 244/119 |
| 2014/0231593 A1 | 8/2014 | Karem |
| 2015/0136906 A1 * | 5/2015 | Fink ....................... B64C 1/18 |
| | | 244/119 |
| 2015/0151845 A1 * | 6/2015 | Jones .................... B64D 37/04 |
| | | 244/135 R |
| 2015/0307178 A1 * | 10/2015 | Fink ...................... B64C 1/062 |
| | | 244/119 |
| 2017/0313434 A1 * | 11/2017 | Peryea ................... B64D 37/06 |

* cited by examiner

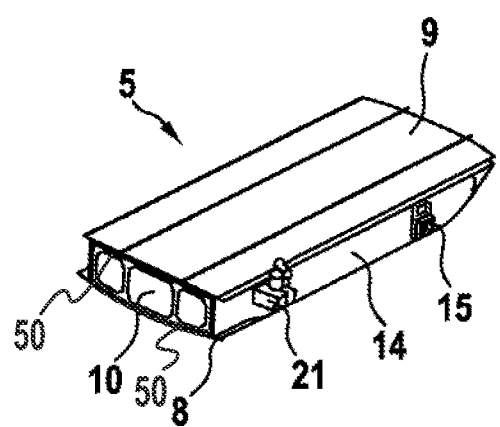
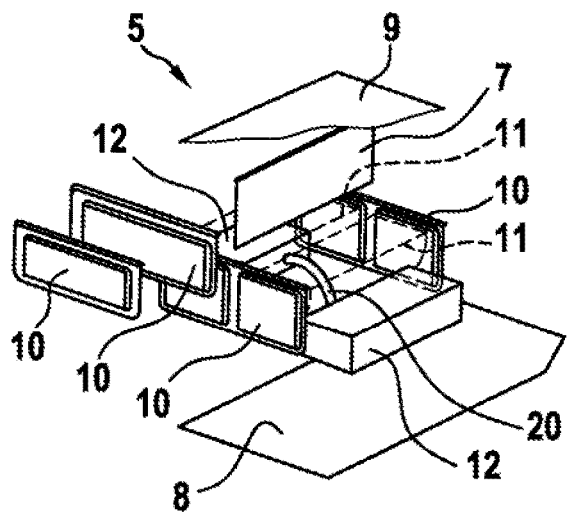
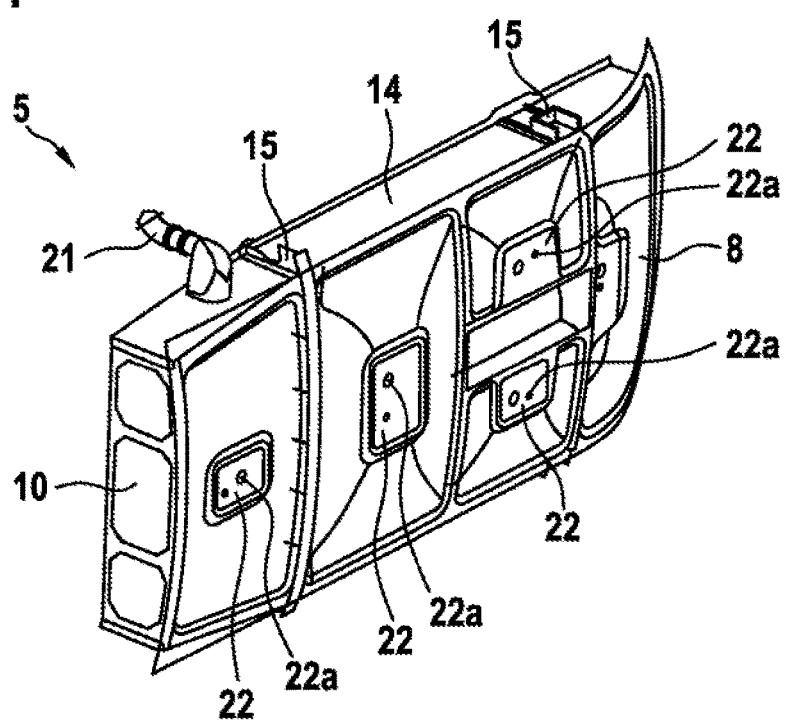

MODULAR SUBFLOOR ARRANGEMENT FOR AN AIRCRAFT

CROSS-REFERENCE TO RELATED APPLICATIONS

This application claims priority to European patent application No. EP 18100017.2 filed on Jun. 20, 2018, the disclosure of which is incorporated in its entirety by reference herein.

BACKGROUND OF THE INVENTION

(1) Field of the Invention

The invention is related to a modular subfloor system with a modular tank system for an aircraft, and, more particularly, to a modular subfloor system that can be assembled and tested independently of the remaining portions of the aircraft, i.e. independently of the assembly of the fuselage of the aircraft, such as a rotary wing aircraft.

(2) Description of Related Art

Generally, continuous frames and/or longerons cover the entire cross section of a subfloor region of a rotary wing aircraft below the floor panel and divide the subfloor region into several individual compartments. A fuel tank system that is usually located in such a subfloor region is thereby required to be separated into several individual fuel bladders which have to be interconnected to each other by means of special fuel system devices such as transfer pipes for fuel transfer between two adjacent fuel bladders and scavenge lines for fuel transfer from e.g. main tanks to feeder tanks. These special fuel system devices have to be conducted through these structural elements, i.e. the frames and/or longerons, and these frames and/or longerons have to be provided with suitable cut-outs. Since integration of the fuel bladders is accomplished after the structural airframe assembly, considerable integration efforts need to be made in terms of installing the fuel systems and connecting the corresponding fuel bladders.

The fuel tank integration procedure is often complex. After the structural assembly, the floor panel has to be removed, the individual fuel bladders are mounted within the subfloor structure, connected to each other, and subsequently the floor panel has to be reinstalled. Special care has to be taken for a leakage-free installation of the fuel transfer lines.

Document U.S. Pat. No. 9,623,950 B2 describes a fuel tank and a differential frame in a fuselage airframe of a helicopter, the fuel tank being installed between the fuselage lower cover shell and the floor panel. The differential frame separates the fuel tank into two individual compartments, the differential frame having a web below the floor panel with a variable-height with a minimum height at the symmetry axis of the fuselage cross-section and a maximum height at lateral frame roots regions. A transversal beam is attached at each of its both ends to the differential frame bridging the entire variable-height of the differential frame and the fuel tank with two front and rear fuel bladders covering both individual tank compartments with a middle bladder installed between the transversal beam and the variable-height web of the differential frame.

Document U.S. Pat. No. 9,638,351 B2 describes a subfloor structure with an integral hull, for a rotary wing aircraft. The subfloor Structure comprises an integral subfloor hull that defines in one piece, upward web portions acting as longerons and a bottom central portion offering both load bearing capabilities and aerodynamical loft features. The subfloor structure is adapted to accommodate fuel tanks and is useful for rotary wing aircrafts such as helicopters and is e.g. made of composite and/or light alloy such as aluminium.

Document U.S. Pat. No. 9,517,831 B2 describes a rotary wing aircraft airframe with a longitudinal axis comprising: a subfloor structure for supporting cabin floor panels and/or at least one fuel tank bladder. Said subfloor structure has a bottom shell, longitudinal support beams, ribs, main frames and floor panels. The bottom shell has a flat shell portion and two lateral shell portions extending integrally from said flat shell portion along its longitudinally oriented sides and being curved towards respective front edges of said ribs and main frames. The longitudinal support beams are provided with attachments for the floor panels, the longitudinal support beams are attached at least partially to the ribs and/or the main frames and the longitudinal support beams are featuring along at least ⅔ of their longitudinal extension a height 2 to 20 times smaller than any distances of any of the floor panels to the bottom shell.

Document U.S. Pat. No. 9,668,544 B2 describes a rotorcraft having a feed unit for feeding fuel to a power plant of the rotorcraft. A middle floor is securely engaged with at least two frames of the fuselage and being load-bearing relative to general forces supported by the fuselage. A bottom compartment of the rotorcraft does not have the load-bearing covering of the fuselage, the bottom face of the fuselage being open to the outside by providing the bottom compartment with a bottom open to the outside of the rotorcraft. The bottom face of the middle floor forms an anchor member for suspending of at least one fuel tank that is accessible from outside the fuselage via said open bottom.

Document U.S. Pat. No. 3,966,147 A describes an externally located crashworthy self-sealing fuel tank for use in combination with military aircraft. The tank, having a cross-sectional shape with a substantially flat top and a shallow catenary extending below the flat top, is suspended within a hammock which is connected to the underside of the aircraft. This installation eliminates the normal surrounding structure which would tend to tumble incoming projectiles and increase the severity of tank wounds, minimizes the damaging effect of hydraulic ram upon the aircraft structure and minimizes hazards of explosions or fires by eliminating voids or cavities adjacent to the fuel tank.

However, none of these documents describes a modular subfloor system with a modular tank system. More particularly, none of these documents describes a modular subfloor system with a modular tank system that can be assembled, tested with respect to fuel volume, tightness, pressure, as well as quality checked independent of remaining fuselage parts of an aircraft, i.e. before the assembly of the modular subfloor system with the remaining fuselage parts of the aircraft.

Thus, after installing the whole fuel system of fuel bladders and fuel system devices within the airframe of conventional aircrafts, the fuel system is sealed and closed and has to be checked by a pressure test. When leakages occur, resealing tasks have to be realized. This is very time consuming and further delays structural assembly of conventional aircrafts. Furthermore, defect detection procedures may be very time consuming as they often require large disassembly and reassembly efforts for defect remedy. The same applies for maintenance operations of the fuel tank in conventional aircrafts.

BRIEF SUMMARY OF THE INVENTION

Based on the limitations and drawbacks of the prior art, an objective is to provide a modular subfloor system that allows being assembled and tested independently of the remaining portions of the aircraft. In particular, the modular tank system should simplify the modular subfloor system assembly procedure as well as the integration of the modular subfloor system with the remaining portions of the aircraft.

This objective is solved by a modular subfloor system that comprises the features of claim 1.

More specifically, a modular subfloor system for a fuselage system of a helicopter, wherein the modular subfloor system is one of several components of the fuselage system, and wherein the modular subfloor system is provided for being equipped separately and independently from any other component of the several components of the fuselage system comprises first longitudinal structural frames and a modular tank system that is connected to the first longitudinal structural frames. The modular tank system comprises a bottom shell of the helicopter, an upper panel, second longitudinal structural frames that are arranged between the bottom shell and the upper panel, transversal structural frames that are arranged between the bottom shell and the upper panel, wherein the transversal structural frames and the second longitudinal structural frames form compartments, tank bladders that are arranged in at least some of the compartments, and sealing elements that seal the upper panel, the bottom shell, and the at least some of the compartments of the modular tank system to ensure at least tightness of the modular tank system relative to the lateral regions.

According to some embodiments, the modular subfloor system and the rest of the helicopter may be equipped in parallel by independent and separate work flows. In other words, a first team may build the structural fuselage element in which the tank system is installed in form of a pre-equipped airframe-tank system unit, and, at the same time, a second team may build another airframe/fuselage element.

According to some embodiments, the pre-equipped airframe-tank system may include structural parts, fuel transfer and feeding lines, sealing elements, at least portions of a cabin floor, tank bladders, and refuelling ports.

According to some embodiments, the modular tank system may be assembled, sealed, tested, and quality checked independent from the rest of the helicopter, which enables parallel production workflows as well as ergonomic working conditions and results in an increasing quality and decreasing recurring costs.

According to some embodiments, working in parallel on the modular subfloor system and the rest of the helicopter may reduce manufacturing costs and processing time.

According to some embodiments, the modular tank system may improve ergonomic conditions for tank bladder installation, pipe installation, etc.

According to some embodiments, working separately on the remaining parts of the helicopter may improve ergonomic conditions for installation tasks including installing the wiring harness, the fuel lines, the ventilation lines, the ducting for air-condition systems, the ducting for heating systems, etc.

According to some embodiments, the modular tank system may be checked for quality and leakage before being assembled with the remaining portions of the helicopter. Thereby, potential problems with the modular tank system can be dealt with before the assembly with the remaining portions of the helicopter and intensive re-work on a complete helicopter can be avoided.

According to one aspect, the upper panel forms at least a portion of a cabin floor surface of the helicopter.

According to one aspect, the modular subfloor system comprises additional transversal structural frames that connect, the first longitudinal structural frames.

According to one aspect, the modular subfloor system comprises an additional bottom shell that is connected to the first longitudinal structural frames and the additional transversal structural frames.

According to one aspect, at least one structural component of the first longitudinal structural frames, the second longitudinal structural frames, the transversal structural frames, or the additional transversal structural frames is adapted for receiving an upper fuselage.

According to one aspect, the upper fuselage comprises vertical structural frames that are attached to the at least one structural component.

According to one aspect, the modular subfloor system comprises attachment points that are adapted for receiving a canopy frame.

According to one aspect, the modular tank system comprises pipes that connect at least a portion of the tank bladders for fuel transfer between the tank bladders, and refuelling ports that provide access to the tank bladders from outside the modular tank system for filling the tank bladders with fuel.

According to one aspect, the modular tank system further comprises equipment plates that are arranged on the bottom shell of the modular tank system.

According to one aspect, the equipment plates provide access to the tank bladders from outside the modular tank system for quality testing of the modular tank system.

Furthermore, a modular tank system for a modular subfloor system of a fuselage system of a helicopter, wherein the modular subfloor system is one of several components of the fuselage system, and wherein the modular subfloor system is provided for being equipped separately and independently from any other component of the several components of the fuselage system, comprises a bottom shell of the helicopter, an upper panel that forms at least a portion of a cabin floor surface of the helicopter, longitudinal and transversal structural frames, and sealing elements. The longitudinal structural frames are arranged between the bottom shell and the upper panel. The transversal structural frames are arranged between the bottom shell and the upper panel, wherein the transversal structural frames and the longitudinal structural frames form compartments. The sealing elements seal the upper panel, the bottom shell, and at least some of the compartments of the modular tank system.

According to one aspect, the modular tank system may include tank bladders and pipes. The tank bladders are arranged in the at least some of the compartments, and the pipes connect at least a portion of the tank bladders.

According to one aspect, the modular tank system may include refuelling ports that provide access to the tank bladders from outside the modular tank system for filling the tank bladders with fuel.

Moreover, a method of assembling a modular fuselage system for a helicopter, wherein the modular fuselage system comprises a modular subfloor system and an upper fuselage, wherein the modular subfloor system and the upper fuselage are provided for being equipped separately and independently from one another, may include the operations of assembling the modular subfloor system, receiving an upper fuselage, performing quality tests of the upper fuselage, and mounting the modular subfloor system to the upper fuselage by connecting at least one structural component.

According to one aspect, the method may further include the operation of mounting a canopy frame to the upper fuselage and the modular subfloor system.

According to one aspect, assembling the modular subfloor system may include the operations of receiving first and second longitudinal structural frames, receiving transversal structural frames, a bottom shell, tank bladders, and an upper panel, using the transversal structural frames, the bottom shell, the tank bladders, and the upper panel to form a modular tank system, and connecting the modular tank system with the first longitudinal structural frames to form the modular subfloor system.

According to one aspect, using the transversal structural frames, the bottom shell, the tank bladders, and the upper panel to form the modular tank system may include the operations of connecting the transversal structural frames with the second longitudinal structural frames, and attaching the bottom shell to the transversal structural frames and the second longitudinal structural frames to form compartments.

According to one aspect, the method may further include the operations of arranging the tank bladders in at least some of the compartments, attaching the upper panel to the transversal structural frames and the second longitudinal structural frames, and sealing the upper panel and the bottom shell to form a modular tank system.

According to one aspect, the method may further include performing quality tests of the modular tank system wherein the quality tests of the modular tank system comprise at least a leak test of the modular tank system.

According to one aspect, performing the quality tests of the modular tank system are performed in parallel with performing the quality tests of the upper fuselage.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 3A is a diagram of an illustrative modular tank system in accordance with some embodiments, FIG. 3B is a diagram of an exploded view of an illustrative modular tank system in accordance with some embodiments, FIG. 4 is a diagram of an illustrative lower part of a modular tank system that includes equipment plates in accordance with some embodiments.

DETAILED DESCRIPTION OF THE INVENTION

Exemplary embodiments may be included in any vehicles with a subfloor system that may include a tank system, if desired. Examples of vehicles may include aircrafts such as airplanes, multicopters, helicopters, drones, or other vehicles that are fuel-driven such as cars, buses, trucks, ships, etc.

Figure 1:
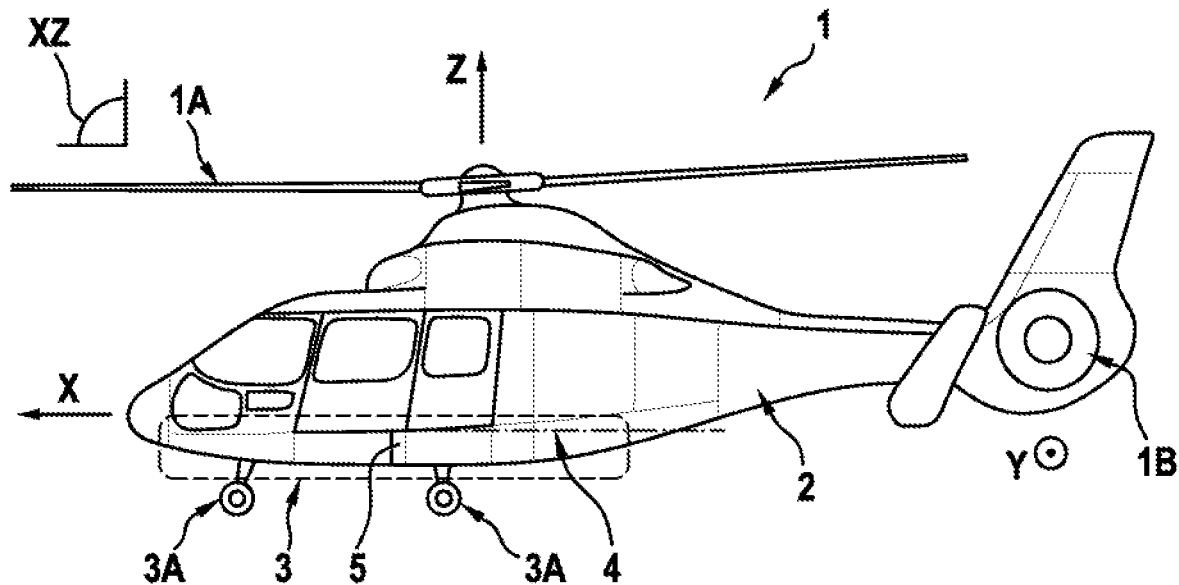
FIG. 1 is a diagram of an illustrative aircraft with a modular subfloor system in accordance with some embodiments.

FIG. 1 shows an example of a vehicle 1. As shown in FIG. 1, the vehicle 1 may be an aircraft and, more particularly, a rotary wing aircraft 1. Rotary wing aircraft 1 is exemplarily illustrated as a helicopter. Thus, for purposes of simplicity and clarity, rotary wing aircraft 1 is hereinafter referred to as "helicopter 1".

In an effort to simplify the discussion of three-dimensional structures, we introduce three mutually orthogonal directions X, Y and Z, that are sometimes also referred to as "axis". These three mutually orthogonal directions are illustratively depicted in FIGS. 1 and 2. A first direction X is referred to as "longitudinal direction" or "longitudinal axis". Typically, a rotation around the longitudinal axis of an aircraft is called "roll". Terms such as front or rear of the aircraft are relative thereto.

A second direction Y is referred to as "transverse direction" or "transverse axis". Typically, a rotation around the transverse axis of an aircraft is called "pitch". The terms "side", "left", or "right" of the aircraft are relative thereto.

A third direction Z is referred to as "vertical direction", "vertical axis", "elevation", or "elevation axis". Typically, a rotation around the elevation axis of an aircraft, is called "yaw". Terms such as "up", "down", "high", or "low" are relative thereto. The directions X, Y and Z together define a referential "XYZ" axis. The directions X and Z together define ante posterior plane XZ of rotary wing aircraft 1.

Helicopter 1 may include one or more rotors, fuselage system 2, modular subfloor system 3, and landing gear 3A. As shown in FIG. 1, the one or more rotors may include main rotor 1A and tail rotor 1B. Fuselage system Z may extend longitudinally and laterally aside ante posterior plane XZ of helicopter 1. If desired, fuselage system 2 may include modular subfloor system 3 that is illustratively connected to landing gear 3A. Landing gear 3A is exemplarily embodied as a wheel landing gear. If desired, modular subfloor system 3 may include modular tank system 5 that may be arranged under cabin floor surface 4. Cabin floor surface 4 may include a portion of the cabin floor. Helicopter 1 may also have additional equipment.

Main rotor 1A of helicopter 1 may be illustratively implemented as a multi-blade rotor. Rotor blades are mounted at an associated rotor head, rotate during operation of helicopter 1 around elevation axis Z, and provide lift and forward or backward thrust.

Figure 2:
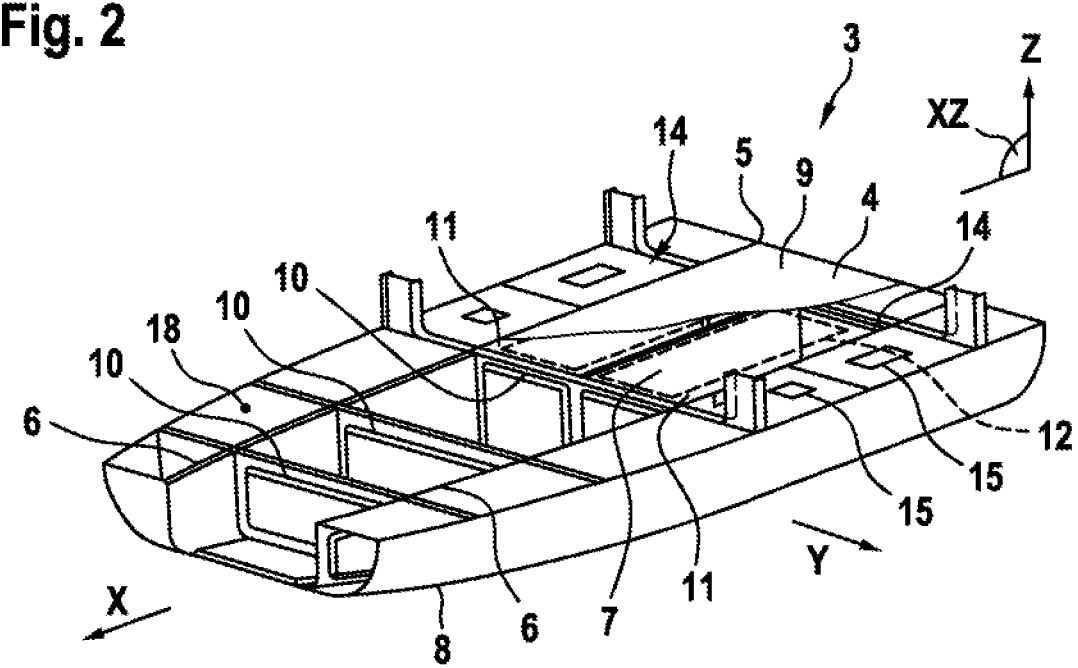
FIG. 2 is a diagram of an illustrative modular subfloor system with a modular tank system in accordance with some embodiments.

FIG. 2 shows illustrative modular subfloor system 3 that may include modular tank system 5, attachment points 18, lateral regions 14, and structural components 15 that are adapted for receiving a part of a fuselage system such as an upper part of fuselage system 2 of FIG. 1.

Modular tank system 5 may be connected to longitudinal structural frames 6. In some embodiments, modular tank system 5 may be at least partially surrounded by lateral regions 14. Modular tank system 5 may include bottom shell 8, upper panel 9, and longitudinal structural frames 7 and transversal structural frames 10 that are arranged between bottom shell 8 and upper panel 9. If desired, transversal structural frames 10 and longitudinal structural frames may be attached to at least one of bottom shell 8 or upper panel 9. As an example, upper panel 9 may form at least a portion of cabin floor surface 4.

Transversal structural frames 10 and longitudinal structural frames 7 may form compartments 11. If desired, tank bladders 12 may be arranged in at least some of the compartments formed by transversal structural frames 10 and longitudinal structural frames 7. Sealing elements 50 may seal upper panel 9, bottom shell 8, and the at least some of the compartments 11 of the modular tank system 5 to ensure at least tightness of the modular tank system 5 relative to the lateral regions.

In some embodiments, modular tank system 5 may be separated from bottom shell 8 of the rotary wing aircraft, for example by auxiliary compartments. In other words, modular tank system 5 and bottom shell 8 may be separate parts of modular subfloor system 3. If desired, bottom shell 8 may be a convex-shaped bowl part. According to one aspect, bottom shell 8 may include a sandwich design with monolithic regions all along longitudinal structural frames 6.

As shown in FIG. 2, longitudinal structural frames 6 may be arranged parallel to ante posterior plane XZ. As an example, longitudinal structural frames 6 may span the entire length of modular subfloor system 3. If desired, in such modular subfloor system 3, transversal structural frames 10 may form crossbeams. In other words, transversal structural frames 10 may be arranged orthogonally to ante posterior plane XZ. If desired, transversal structural frames 10 may span the whole width of modular subfloor system 3.

Exemplarily, modular subfloor system 3 may house various systems and/or pieces of equipment (e.g., electrical, mechanical, or armouring equipment) such as tank bladders 12, pipes 20, sealing elements 50, refuelling ports 21, test lines, fuel transfer lines, fuel feeding lines, structural components 15, wiring harness, ducting for air-condition systems, and ducting for heating systems, etc.

As an example, these systems and/or pieces of equipment may be arranged in lateral regions 14 and/or in modular tank system 5. In some embodiments, lateral regions 14 may be located laterally between longitudinal structural frames 6 and outside portions of modular subfloor system 3. If desired, modular subfloor system 3 may provide for substantial kinetic energy absorption in a crash scenario of helicopter 1. Longitudinal structural frames 6 may be beams that work as main load carrying members.

If desired, structural components 15 for receiving a part of a fuselage system such as a part of fuselage system 2 of FIG. 1 may be arranged on longitudinal structural frames 6, longitudinal structural frames 7, and/or transversal structural frames 10.

FIG. 3A shews an illustrative modular tank system 5 that includes bottom shell 3, upper panel 9, longitudinal structural frames, and transversal structural frames 10. As an example, longitudinal structural frames (e.g., longitudinal structural frames 7 of FIG. 3B) and transversal structural frames 10 may be arranged between bottom shell 8 and upper panel 9 and form compartments. If desired, tank bladders may be installed in at least some of the compartments formed by longitudinal structural frames and transversal structural frames 10.

Illustratively shown in FIG. 3A are lateral regions 14 which may be adjacent to modular tank system 5. If desired, some portions of modular tank system 5 may be arranged in lateral regions 14. Sealing elements 50 may seal upper panel 9, bottom shell 8, and the at least some of the compartments 11 of the modular tank system 5 to ensure at least tightness of the modular tank system 5 relative to lateral regions 14.

Exemplarily, as illustrated in FIG. 3A, lateral regions 14 may include refuelling ports 21 for refuelling tank bladders and at least one structural component 15 for receiving a part of a fuselage system such as a part of fuselage system 2 of FIG. 1.

Upper panel 9 may form at least a portion of cabin floor surface 4 of modular subfloor system 3.

FIG. 3B shows an exploded view of illustrative modular tank system 5. As shown, modular tank system 5 may include longitudinal structural frame 7 and transversal structural frames 10 that are arranged between bottom shell 8 and upper panel 9. If desired, at least one of bottom shell 8 or upper panel 9 may be attached to transversal structural frames 10 and/or longitudinal structural frames 7. Transversal structural frames 10 and longitudinal structural frames 7 may form compartments 11 between bottom shell 8 and upper panel 9. In compartments 11, tank bladders 12 may be installed. Tank bladders 12 may be connected with each other using pipes 20, if desired.

In some embodiments, modular tank system 5 may include sealing elements 50 that seal upper panel 9, bottom shell 8, and compartments 11 of modular tank system 5 to ensure tightness of modular tank system 5. Upper panel 9 may form at least a portion of cabin floor surface 4 of modular subfloor system 3.

In some embodiments, a modular subfloor system such as modular subfloor system 3 of FIG. 2 may include modular tank system 5 of FIG. 3A or 3B.

FIG. 4 shows an illustrated bottom view of modular tank system 5 that includes bottom shell 8, equipment plates 22 for covering equipment holes 22a that are arranged on bottom shell 8, transversal structural frame 10 that is attached to bottom shell 8, refuelling port 21, and structural elements 15 that are arranged on lateral region 14 of modular tank system 5.

Equipment plates that are arranged on bottom shell 8 may cover equipment holes 22a that, provide access to tank bladders 12, pipes, hoses, fittings, ports, etc. and/or other equipment within modular tank system 5 such as ventilation and filler lines from outside modular tank system 5. Such access may be desirable for the maintenance and/or the installation of modular tank system 5.

Exemplarily, as illustrated in FIG. 4, such modular tank system 5 may include refuelling ports 21 for refuelling tank bladders and structural components 15 for receiving a part of a fuselage system. If desired, refuelling ports 21 and structural components 15 may be arranged in lateral regions 14. If desired, structural components 15 may also be arranged on longitudinal structural frames and/or transversal structural frames 10 for receiving a part of a fuselage system.

In some embodiments, bottom shell 5 may be a single bowl-shaped part that may include a sandwich design with monolithic regions.

Figure 5:
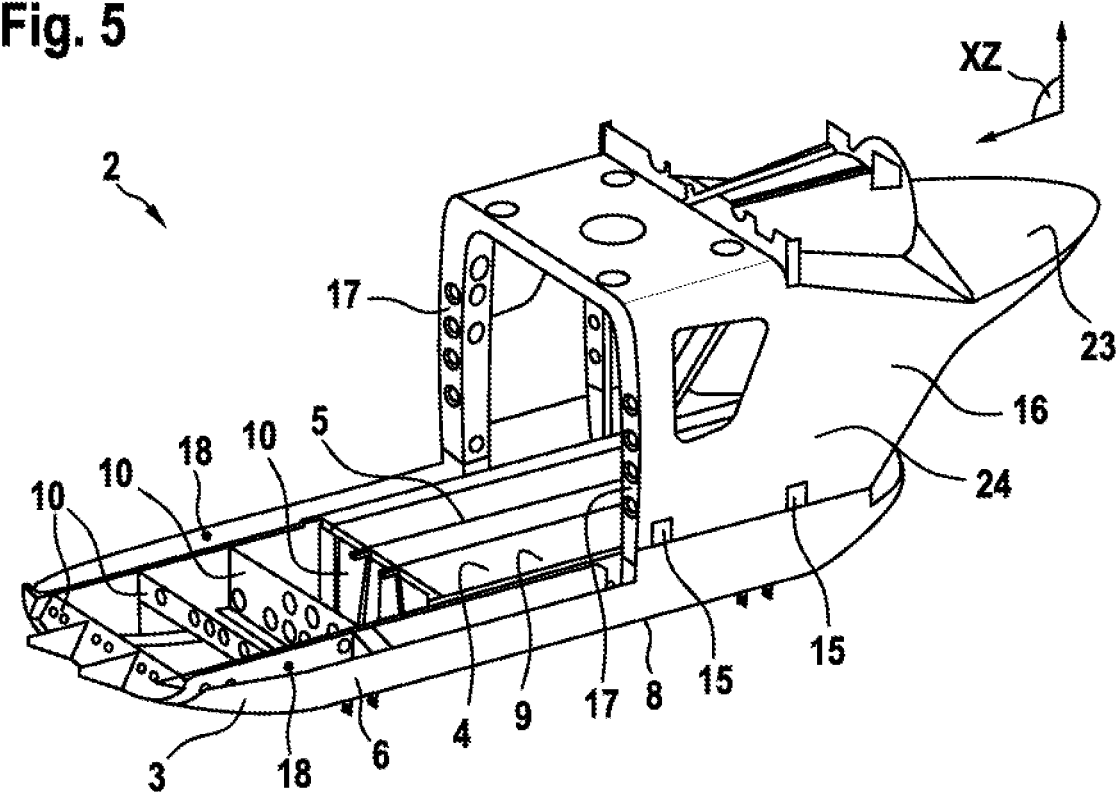
FIG. 5 is a diagram of illustrative parts of a fuselage system with an upper fuselage that is attached to a modular subfloor system in accordance with some embodiments.

FIG. 5 shows illustrative parts of fuselage system 2 with upper fuselage 16 that is attached to modular subfloor system 3. Upper fuselage 16 may include side shells 24, vertical structural frames 17 that are arranged on side shells 24, and rear deck 23 that is attached to side shells 24.

Modular subfloor system 3 may include attachment points 18 that are adapted for receiving upper fuselage 16, cabin floor surface 4, structural components 15, transversal structural frames 10, and modular tank system 5 that is arranged between longitudinal structural frames 6. Modular tank system 5 may include bottom shell 8, upper panel 9, and transversal structural frames 10 that are arranged between bottom shell 8 and upper panel 9.

In some embodiments, upper fuselage 16 may form a part of the cabin of a helicopter such as helicopter 1 of FIG. 1. For example, upper fuselage 16 may form the rear part of the cabin. If desired, upper fuselage 16 may include storage for in-flight service, seats, and flight instruments. If desired, storage for in-flight service may be arranged in rear deck 23 of upper fuselage 16. Exemplary seats and flight instruments may be arranged in the space between side shells 24.

In some embodiments, vertical structural frames 17 may be arranged along ante posterior plane XZ. Vertical structural frames 17 and may span the entire height, of side shells 24. If desired, vertical structural frames 17 may be attached to structural components 15 that are arranged on longitudinal structural frames 6.

Exemplarily, modular subfloor system 3 may house various systems and/or pieces of equipment (e.g. electrical, mechanical, and armouring equipment). Such systems and/or pieces of equipment may be arranged in lateral volumes that are enclosed between longitudinal structural frames 6 and side portions of bottom shell 8. If desired, modular subfloor system 3 may provide for substantial kinetic energy absorption in a crash scenario of a helicopter. Longitudinal structural frames 6 may be beams that work as main load carrying members.

In some embodiments, modular tank system 5 may include sealing elements that close and seal modular tank system 5. If desired, upper panel 9 may form at least a portion of cabin floor surface 4.

Figure 6:
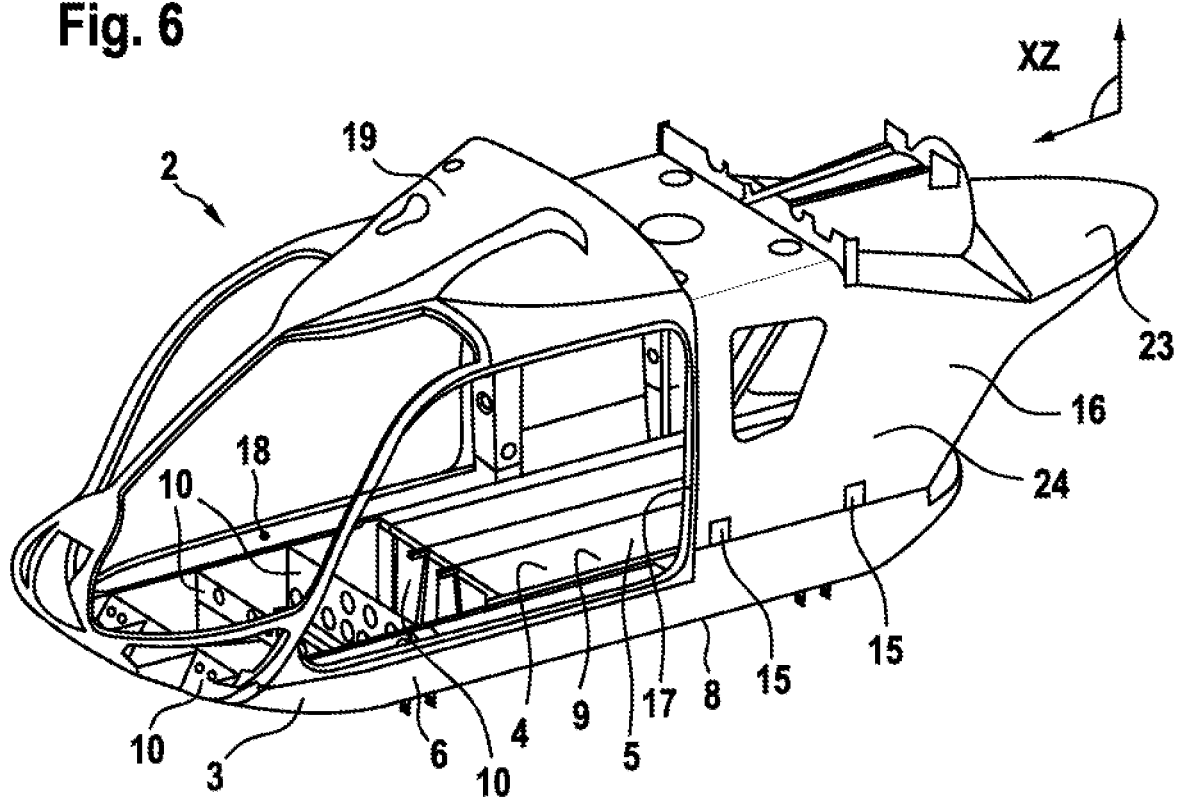
FIG. 6 is a diagram of an illustrative modular fuselage system that includes an upper fuselage and a canopy frame attached to a modular subfloor system.
Figure 7:
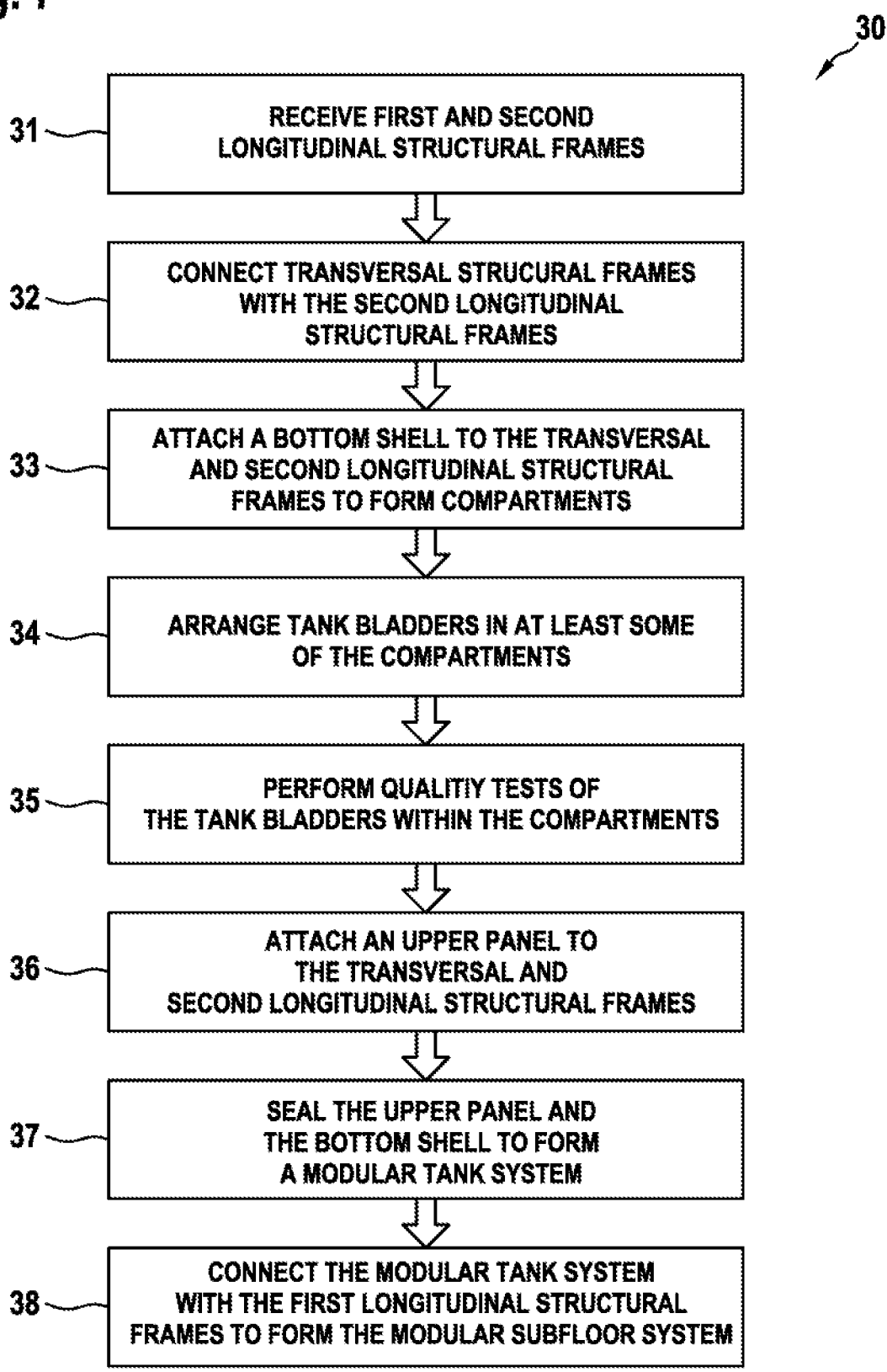
FIG. 7 is a diagram of a flowchart showing illustrative operations for assembling a modular subfloor system in accordance with some embodiments.

FIG. 6 shows illustrative fuselage system 2 that includes upper fuselage 16, canopy frame 19, and modular subfloor system 3. Upper fuselage 16 may include side shells 24, vertical structural frames 17 that are arranged on side shells 24, and rear deck 23 that is attached to side shells 24.

Modular subfloor system 3 may include attachment points 13 that are adapted for receiving upper fuselage 16, cabin floor surface 4, structural components 15, transversal structural frames 10, and modular tank system 5 that is arranged between longitudinal structural frames 6. Modular tank system 5 may include bottom shell 8, upper panel 9, and transversal structural frames 10 that are arranged between bottom shell 8 and upper panel 9.

Canopy frame 19 may be attached to vertical structural frames 17 of upper fuselage 16. If desired, canopy frame 19 may house various pieces of equipment such as flight instruments on an instrument panel or the controls that enable the pilot to fly the aircraft.

Canopy frame 19 may be attached to modular subfloor system 3 at attachment points 18 that are arranged between longitudinal structural frames 6 and side portions of bottom shell 8. If desired, canopy frame 19 may be connected with modular subfloor system 3 using structural elements 15 that are arranged on longitudinal structural frames 6. In some embodiments, canopy frame 19 may form a cockpit of a helicopter such as helicopter 1 of FIG. 1. If desired, a door frame may be used between upper fuselage 16 and canopy frame 19 for separating the cockpit from the cabin.

In some embodiments, upper fuselage 16 may form a part of the cabin of a helicopter such as for example a rear part of the cabin. Upper fuselage 16 may include storage for in-flight service, seats, and flight instruments. If desired, storage for in-flight service may be arranged on rear deck 23 of upper fuselage 16. Exemplary seats and flight instruments may be arranged in the space between, side shells 24.

In some embodiments, vertical structural frames 17 may be arranged along ante posterior plane XZ and may span the entire height of side shells 24. Vertical structural frames 17 may be attached with their bottom section to structural components 15 that are arranged on longitudinal structural frames 6.

In some embodiments, modular tank system 5 may include sealing elements that close and seal modular tank system 5. If desired, upper panel 9 may form at least a portion of cabin floor surface 4.

Separating fuselage system 2 into several components including modular subfloor system 3, upper fuselage 16, and canopy frame 19 may enable separate workflows during which installation tasks can be done in parallel for every one of the components of fuselage system 2. The installation tasks on the individual components may be performed under optimized ergonomic conditions. If desired, modular subfloor system 3 may include modular tank system 5, which may be pre-checked for leakage and quality checked prior to assembling modular subfloor system 3 with the other components of fuselage system 2.

FIG. is a flowchart 30 showing illustrative operations for assembling a modular subfloor system for an aircraft, such as modular subfloor system 3 of any of FIGS. 1 to 6. If desired, an operator and/or one or more assembly lines may perform operations 31 to 33 of flowchart 30.

During operation 31, the operator and/or the one or more assembly lines may receive first and second longitudinal structural frames. For example, an assembly line may receive longitudinal structural frames 6 and longitudinal structural frames 7 of FIG. 2.

During operation 32, the operator and/or the one or more assembly lines may connect transversal structural frames with second longitudinal structural frames. For example, longitudinal structural frames 7 of FIG. 2 may be connected with transversal structural frames 10.

During operation 33, the operator and/or the one or more assembly lines may attach a bottom shell to the transversal and second longitudinal structural frames to form compartments. For example, as shown in FIG. 2, longitudinal structural frames 7 and transversal structural frames 10 may be attached to bottom shell 6 to form compartments 11.

During operation 34, the operator and/or the one or more assembly lines may arrange tank bladders in at least some of the compartments. For example, tank bladders 12 of FIG. 2 may be arranged in at least some compartments 11. If desired, other parts of the fuel distribution system such as pipes, hoses, fittings, ports, etc. may be arranged in at least some compartments 11.

During operation 35, the operator and/or the one or more assembly lines may perform quality tests of the tank bladders within the compartments. For example, quality tests of tank bladders 12 of FIG. 2 may be performed within compartments 11. If desired, the quality tests may include a leak test of modular tank system 5.

During operation 36, the operator and/or the one or more assembly lines may attach an upper panel to the transversal and second longitudinal structural frames. For example, as shown in FIG. 2, longitudinal structural frames and transversal structural frames 10 may be attached to upper panel 9.

During operation 37, the operator and/or the one or more assembly lines may seal the upper panel and the bottom shell to form a modular tank system. For example, as shown in FIG. 2, upper panel 9 and bottom shell 8 may be sealed to form modular tank system 5.

During operation 38, the operator and/or the one or more assembly lines may connect the modular tank system with the first longitudinal structural frames to form the modular subfloor system. For example, as shown in FIG. 2, modular tank system 5 may be connected with longitudinal structural frames 6 to form modular subfloor system 3.

Figure 8:
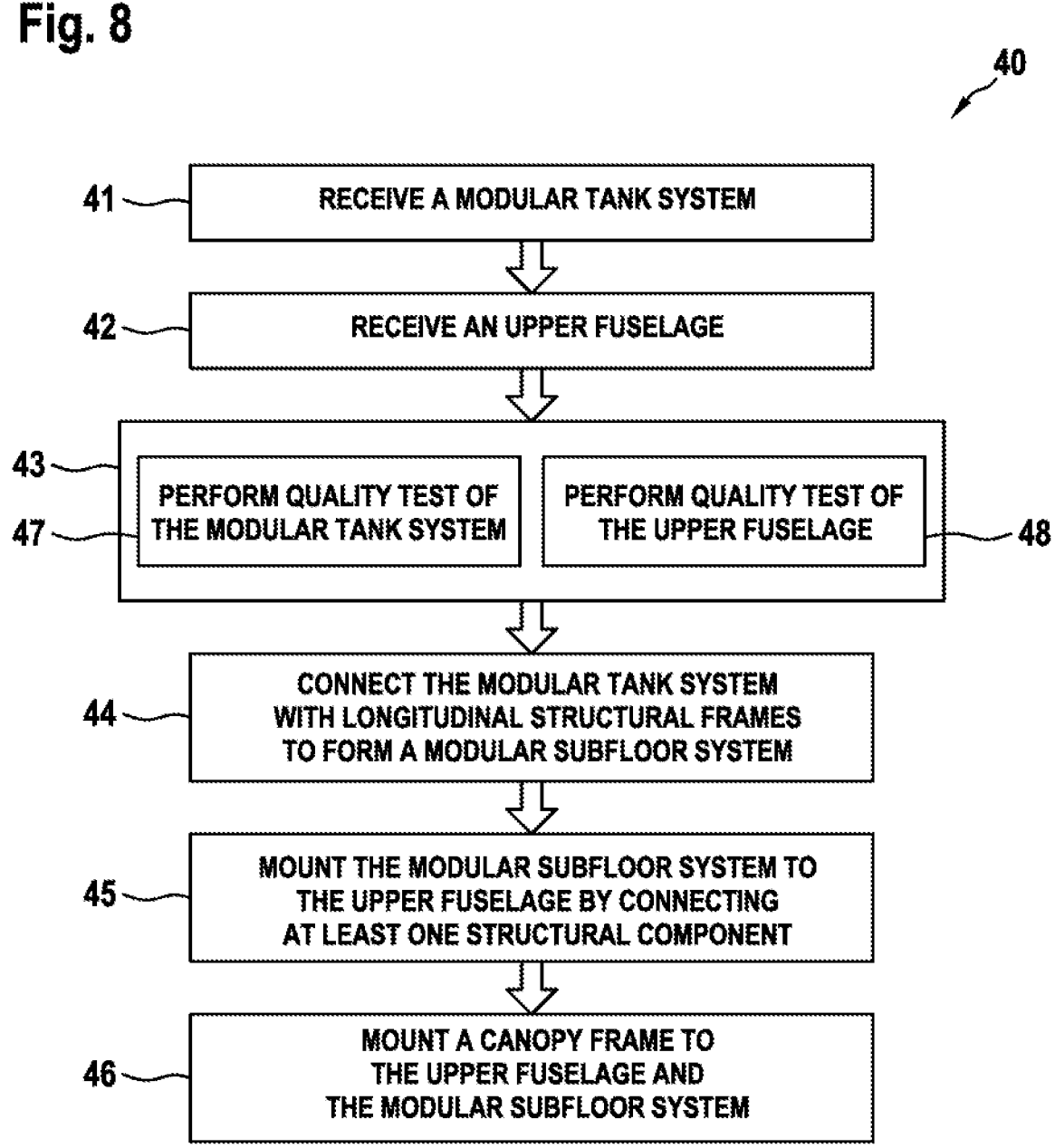
FIG. 8 is a diagram of a flowchart showing illustrative operations for assembling a modular fuselage system in accordance with some embodiments.

FIG. 8 is a flowchart 40 showing illustrative operations for assembling a modular fuselage system for an aircraft such as assembling fuselage system 2 for rotary wing aircraft 1 of FIG. 6. If desired, an operator and/or one or more assembly lines may perform operations 41 to 48 of flowchart 40.

During operation 41, the operator and/or one or more assembly lines may receive a modular tank system. For example, modular tank system 5 of FIG. 6 may be received.

During operation 42, the operator and/or one or more assembly lines may receive an upper fuselage. For example, upper fuselage 16 of FIG. 6 may be received.

During operation 47, the operator and/or one or more assembly lines may perform quality tests of the modular tank system. For example, quality tests of modular tank system 5 of FIG. 6 may be performed.

During operation 48, the operator and/or one or more assembly lines may perform quality tests of the upper fuselage. For example, quality tests of upper fuselage 16 of FIG. 6 may be performed.

In some embodiments, the operator and/or one or more assembly lines may perform operations 47 and 48 that are part of operation 43 in parallel.

During operation 44, the operator and/or one or more assembly lines may connect the modular tank system with longitudinal structural frames to form a modular subfloor system. For example, modular tank system 5 of FIG. 6 may be connected with longitudinal structural frames 6 to form modular subfloor system 3.

During operation 45, the operator and/or one or more assembly lines may mount the modular subfloor system to the upper fuselage by connecting at least one structural component. For example, modular subfloor system 3 of FIG. 6 may be mounted to upper fuselage 16 by connecting structural components 15 with upper fuselage 16.

During operation 46, the operator and/or one or more assembly lines may mount a canopy frame to the upper fuselage and the modular subfloor system. For example, canopy frame 19 of FIG. 6 may be mounted to upper fuselage 16 and modular subfloor system 3.

It should be noted that the above-described embodiments are merely described for illustration purposes, but not in order to restrict the present invention thereto. Instead, multiple modifications and variations of the presented embodiments are possible and should, therefore, also be considered as being part of the invention. For example, modular subfloor system 3 of FIG. 2 is adapted for an aircraft 1. If desired, modular subfloor system 3 of FIG. 2 may be adapted for cars, buses, trucks, ships, etc.

As another example, modular tank system 5 of FIG. 3B is shown to include longitudinal structural frame 7, bottom shell 3, four transversal structural frames 10, upper panel 9, and two compartments 11. However, modular tank system 5 of FIG. 3B may have any number of longitudinal and transversal structural frames 1, 10, and any number of compartments 11 that are formed by these longitudinal and transversal structural frames 7, 10.

Moreover, modular tank system 5 of FIG. 4 is shown with four equipment plates 22 covering eight equipment holes 22a. However, modular tank system 5 of FIG. 4 may have any number of equipment plates 22 with any number of equipment holes 22a.

Furthermore, operations 41, 42, 47, 48, and 44 of FIG. 8 are shown in a given order. However, operations 41, 47, and 41 are independent of operations 42 and 48. Thus, as long as operation 41 occurs before operation 41, operation 47 before operation 44, and operation 42 before 48, any order may be appropriate. Tor example, operations 42 and 43 may be performed in parallel with operations 41, 47, and 44. As another example, the operations may be performed in the order 42, 41, 41, 44, 18 or in the order 42, 41, 43, 47, 44, etc.

REFERENCE LIST 1 rotary wing aircraft
1A main rotor
1B tail rotor
2 fuselage system
3 modular subfloor system
3A landing gear
4 floor surface
5 modular tank system
6 longitudinal structural frame
7 longitudinal structural frame
8 bottom shell
9 upper panel
10 transversal structural frame
11 compartment
12 tank bladder
14 lateral region
15 structural component
16 upper fuselage
17 vertical structural frame
18 attachment point
19 canopy frame
20 pipe
21 refuelling port
22 equipment plate
22a equipment hole
23 rear deck
24 side shell
30 flowchart
31, 32, 33, 34, 35, 36, 37, 38 operations
40 flowchart
41, 42, 43, 44, 45, 46, 47, 48 operations
X longitudinal axis
Y transverse axis
Z elevation axis
XZ ante posterior plane

What is claimed is:

1. A modular subfloor system for a fuselage system of a helicopter, wherein the modular subfloor system is one of several components of the fuselage system, and wherein the modular subfloor system is provided for being equipped separately and independently from any other component of the several components of the fuselage system, comprising:
   first longitudinal structural frames;
   lateral regions; and
   a modular tank system that is connected to the first longitudinal structural frames and comprises:
      a bottom shell of the helicopter,
      an upper panel,
      second longitudinal structural frames arranged between the bottom shell and the upper panel,
      transversal structural frames arranged between the bottom shell and the upper panel, wherein the transversal structural frames and the second longitudinal structural frames form compartments,
      tank bladders arranged in at least some of the compartments, and sealing elements that seal the upper panel, the bottom shell, and the at least some of the compartments of the modular tank system to ensure at least tightness of the modular tank system relative to the lateral regions.

2. The modular subfloor system of claim 1, wherein the upper panel forms at least a portion of a cabin floor surface of the helicopter.

3. The modular subfloor system of claim 1, further comprising:
additional transversal structural frames that connect the first longitudinal structural frames.

4. The modular subfloor system of claim 3, further comprising:
an additional bottom shell connected to the first longitudinal structural frames and the additional transversal structural frames.

5. The modular subfloor system of claim 3, wherein at least one structural component of the first longitudinal structural frames, the second longitudinal structural frames, the transversal structural frames, or the additional transversal structural frames receives an upper fuselage.

6. The modular subfloor system of claim 5, wherein the upper fuselage comprises:
vertical structural frames that are attached to the at least one structural component.

7. The modular subfloor system of claim 3, further comprising:
attachment points that receive a canopy frame.

8. The modular subfloor system of claim 1, wherein the modular tank system further comprises:
pipes that connect at least a portion of the tank bladders for fuel transfer between the tank bladders; and
refuelling ports that provide access to the tank bladders from outside the modular tank system for filling the tank bladders with fuel.

9. The modular subfloor system of claim 1, wherein the modular tank system further comprises:
equipment plates that are arranged on the bottom shell of the modular tank system.

10. The modular subfloor system of claim 9, wherein the equipment plates provide access to the tank bladders from outside the modular tank system for quality testing of the modular tank system.

11. A modular tank system for a modular subfloor system of a fuselage system of a helicopter, wherein the modular subfloor system is one of several components of the fuselage system, and wherein the modular subfloor system is provided for being equipped separately and independently from any other component of the several components of the fuselage system, comprising:
a bottom shell of the helicopter;
an upper panel that forms at least a portion of a cabin floor surface of the helicopter;
longitudinal structural frames arranged between the bottom shell and the upper panel;
transversal structural frames arranged between the bottom shell and the upper panel, wherein the transversal structural frames and the longitudinal structural frames form compartments; and
sealing elements that seal the upper panel, the bottom shell, and at least some of the compartments of the modular tank system.

12. The modular tank system of claim 11, further comprising:
tank bladders arranged in the at least some of the compartments; and
pipes that connect at least a portion of the tank bladders.

13. The modular tank system of claim 12, further comprising:
refuelling ports that provide access to the tank bladders from outside the modular tank system for filling the tank bladders with fuel.

14. The modular subfloor system of claim 1, wherein the first longitudinal structural frames comprise two laterally spaced apart frames, and the modular tank system is disposed between the spaced frames.

15. The modular subfloor system of claim 1, wherein the sealing elements are disposed between the upper panel, the bottom shell and the tank bladders.

16. The modular subfloor system of claim 15, wherein the sealing elements are connected to the upper panel and the bottom shell.

17. A method of assembling a modular fuselage system for a helicopter, wherein the modular fuselage system comprises a modular subfloor system and an upper fuselage, wherein the modular subfloor system and the upper fuselage are provided for being equipped separately and independently from one another, comprising:
receiving first and second longitudinal structural frames;
receiving transversal structural frames, a bottom shell, tank bladders, and an upper panel;
using the transversal structural frames, the bottom shell, the tank bladders, and the upper panel to form a modular tank system;
sealing at least the upper panel and the bottom shell to ensure tightness of the modular tank system;
connecting the modular tank system with the first longitudinal structural frames to form the modular subfloor system;
receiving the upper fuselage; and
mounting the modular subfloor system to the upper fuselage by connecting at least one structural component.

18. The method of claim 17, further comprising:
mounting a canopy frame to the upper fuselage and the modular subfloor system.

19. The method of claim 17, wherein using the transversal structural frames, the bottom shell, the tank bladders, and the upper panel to form the modular tank system further comprises:
connecting the transversal structural frames with the second longitudinal structural frames; and
attaching the bottom shell to the transversal structural frames and the second longitudinal structural frames to form compartments.

20. The method of claim 19, further comprising:
arranging the tank bladders in at least some of the compartments; and
attaching the upper panel to the transversal structural frames and the second longitudinal structural frames.

* * * * *